United States Patent
Egnell et al.

(10) Patent No.: US 6,590,681 B1
(45) Date of Patent: *Jul. 8, 2003

(54) OPTICAL WDM NETWORK HAVING AN EFFICIENT USE OF WAVELENGTHS AND A NODE THEREFOR

(75) Inventors: Lars Egnell, Saltsjöbaden (SE); Bengt Johansson, Hägersten (SE); Robert Batchellor, West Sussex (GB); Nigel Wood, Northants (GB); Magnus Öberg, Hägersten (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 09/328,385

(22) Filed: Jun. 9, 1999

(30) Foreign Application Priority Data

Jun. 10, 1998 (SE) .............................. 9802070

(51) Int. Cl.[7] .............................................. H04J 14/02
(52) U.S. Cl. ........................ 359/127; 359/119; 359/128
(58) Field of Search .................................. 359/119–134

(56) References Cited

U.S. PATENT DOCUMENTS

| | | | | |
|---|---|---|---|---|
| 5,864,414 A | * | 1/1999 | Barnsley et al. ............ | 359/110 |
| 5,872,809 A | * | 2/1999 | Batruni ........................ | 370/274 |
| 6,023,359 A | * | 2/2000 | Asahi .......................... | 359/110 |
| 6,046,833 A | * | 4/2000 | Sharma et al. .............. | 359/110 |
| 6,204,943 B1 | * | 3/2001 | Hamel et al. ................ | 359/119 |

* cited by examiner

Primary Examiner—Leslie Pascal
(74) Attorney, Agent, or Firm—Nixon & Vanderhye P.C.

(57) ABSTRACT

An optical fiber network of WDM type comprises two fibers which carry light signals propagating in opposite directions and which are arranged in a ring configuration. One standby link between two neighboring nodes is inactive but is made active if an active link fails. An add and drop node used in the network has band blocking filters connected in a fiber between a drop coupler and an add coupler, taking out a share of the light power in each direction to be received through bandpass filters in receivers and adding new wavelength channels produced in transmitters, respectively. Switches are used for receiving and transmitting on the wavelength channels in correct directions. The positions of the switches can be changed when the inactive link has to become one of the two active links directly connected to the node. A very efficient use of the wavelength channels in the network can then be achieved for nodes having a minimum of in-line components, and particularly, a minimum of in-line filtering components.

5 Claims, 6 Drawing Sheets

OPTICAL WDM NETWORK HAVING AN EFFICIENT USE OF WAVELENGTHS AND A NODE THEREFOR

The invention relates to an optical fiber network using wavelength division multiplexing (WDM) and an add and drop node for such a network.

BACKGROUND

Optical multi-channel systems employing wavelength multiplexing are used both in new networks and in order to enhance the transmission capability of existing optical fiber networks. Thus, information channels which previously had to be transmitted on a plurality of separate fiber pairs are forwarded on a single fiber pair in WDM networks. Using optical wavelength division multiplexed channels means that a plurality of serial information signals, i.e. a plurality of serial binary signals, are transmitted on the same optical fiber by modulating such a serial signal on a light signal, also called carrier, having a definite wavelength and then combining the modulated light signals in an optical coupler or optical multiplexer to a composite light signal on the considered optical fiber. The signal primarily modulated on a monochromatic light signal or carrier together with the carrier can be called a channel or traffic channel.

Self-healing optical fiber networks having a ring configuration are disclosed in U.S. Pat. No. 5,442,623, but they are not particularly adapted to WDM-signaling. A similar network designed for WDM-traffic is disclosed in the International patent application PCT/SE98/00136. The networks described in these documents use an extra protecting fiber pair between each pair of nodes.

Optical wavelength multiplexing can generally be used in different optical fiber network configurations or architectures having e.g. only a single fiber pair between a pair of nodes. Such an architecture is the FlexBus™ concept as described in B. S. Johansson et al., "Flexible bus: A self-restoring optical ADM ring architecture", Electronics Letters, Dec. 5, 1996, Vol. 32, No. 25, and U.S. patent application Ser. No. 08/421,734, this architecture comprising a ring configuration of optical links connecting a plurality of nodes. The FlexBus™ concept has emanated from the need for protecting ring networks against fiber cuts and optical amplifier failures, and to solve the problem, often associated with ring network architectures, of circulating signals and noise. In the FlexBus™ architecture one section of the fiber ring is always lade passive or inactive by means of optical switches or amplifiers. This intentionally introduced break effectively eliminates all problems associated with circulating signals and hence allows that less circuit components can be used and circuit elements having lower performance can be used, while still retaining the shortest longest path possible. In the case of a real failure of a link, that link which previously has been intentionally made inactive is made active and the failed link now becomes the inactive link, what can be described by having the inactive link moved from its former position to the failed section. This procedure is called that "the bus flexes", and thereby the traffic is restored.

In the FlexBus™ channel blocking or selection filters placed in the lines are not needed, which alleviates the problems associated with concatenated filtering. The signal from one transmitter can be sent in both directions simultaneously without causing interference, and the same wavelength can be used in both directions, thus allowing the same number of bi-directional connections to be set up as the number of wavelengths that are used in the network.

With the maturing of filtering and switching technology it would, however, be beneficial to be able to reuse wavelengths more than once in order to be able to set up more connections and thus increase network capacity for the limited number of wavelengths that are feasible in a network with regard to available optical amplifier gain-bandwidth, realistic filter bandwidths and frequency stability of filters and light sources. Thus another implementation of a node architecture, based on the FlexBus™ but including a plurality of blocking filters and switches connected in-line, i.e. in the direct path of a fiber of the network or bus through the node, was invented and is disclosed in the published International patent application WO 96/31025 and is called the "Rearrangeable FlexBus™". That implementation is capable of a very efficient use of the wavelengths. In the published International patent application WO 96/24998 an algorithm scheme for wavelength allocation in Rearrangeable FlexBus™ networks is disclosed. An add/drop node for a WDM network is disclosed in the published International patent application WO 98/49794 which can allow some reuse of wavelengths.

SUMMARY

It is an object of the invention to provide an add and drop node for a network of the kind Rearrangeable FlexBus™ as described above having a minimum of in-line components and enhancing the reliability of the network but still having the good properties of the FlexBus™ and the efficient use of wavelengths as defined in the concept of the Rearrangeable FlexBus™.

The problem to be solved by the invention is how to achieve a node construction for a network of the kind Rearrangeable FlexBus™ operating substantially as the nodes of that bus allowing an efficient wavelength allocation in the network and allowing the network and the nodes to operate in a reliable way. In particular, in the network, the nodes should not transmit information over links where it is not needed or where it will not be received by any downstream node.

Thus generally, an add/drop node is provided which is arranged to be connected in an optical fiber WPM network. The network has a ring configuration including two fibers carrying light signals in opposite directions. Thus, the network has links connecting neighbouring nodes. For protection, the network always has one inactive link carrying no light signals and the network is constructed so that the inactive link can be made active and another link can be made inactive. Since the network is WDM-type, information is carried in the network in a plurality of separate wavelength bands for the light signals. The add/drop node comprises in the conventional way drop couplers and add couplers for each direction for taking out a share of signals at the add/drop node and for adding signals in the add/drop node respectively. The node further comprises as conventional receivers and transmitters for receiving light signals in wavelength bands in the add/drop node and transmitters for transmitting light signals in wavelength bands from the add/drop node into the network. The add/drop node further comprises a band blocking filter arranged between a drop coupler and an add coupler for blocking in one direction all wavelengths which are received and/or terminated in the node from that direction. Preferably, the band blocking filter is arranged for blocking all wavelengths which are received in the node from either direction and are reused in the node.

In the node at least one switch is provided, which advantageously is connected according to one of the following cases:

to a receiver and the drop couplers for allowing the receiver to receive from either one of the two opposite directions, or to a transmitter and the add couplers for allowing the transmitter to transmit in either one of the two opposite directions.

Preferably, two separate switches are provided, one connected according to the first of said cases and one connected according to the second of said cases.

Further switching means can be provided for letting, in a first position of the switching means, the light signals of a wavelength pass through the node in a substantially unaffected way and in a first direction. The same wavelength is then received from a second direction opposite to the first one. In a second different position of the switching means they block the wavelength as received from the second direction. The switching means for receiving in a wavelength band and at each instant only in one direction can comprise a 2:3 switch having its inputs connected to bandpass filters for the wavelength band. Each bandpass filter is then connected to a drop coupler, so that the switch receives light from opposite directions. The 2:3 switch preferably has one of its outputs connected to a receiver for the wavelength band and another output connected to an add coupler for light signals in a second direction opposite to the first one.

The optical fiber WPM network built from such add/drop nodes and possibly other nodes having the same or corresponding switching facilities allows an efficient use of wavelength. Thus, the nodes can be arranged to use at least one wavelength band in such a way that the wavelength band is used by at least two separate first nodes for transmitting to a second nodes, which are different from each other, in a first direction and is used by only one third node to transmit to a fourth node in a second direction opposite to the first direction.

In the network a transmission span can be defined to be the piece of the network between a node transmitting information in a wavelength band and another node receiving the information on the same wavelength band. Then advantageously, the transmission spans of the at least two separate first nodes for the wavelength band in the first direction are arranged not to overlap each other. The transmission span of the third node for the wavelength in the second direction preferably extends over the spans of the at least two separate first nodes for the wavelength in the first direction.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
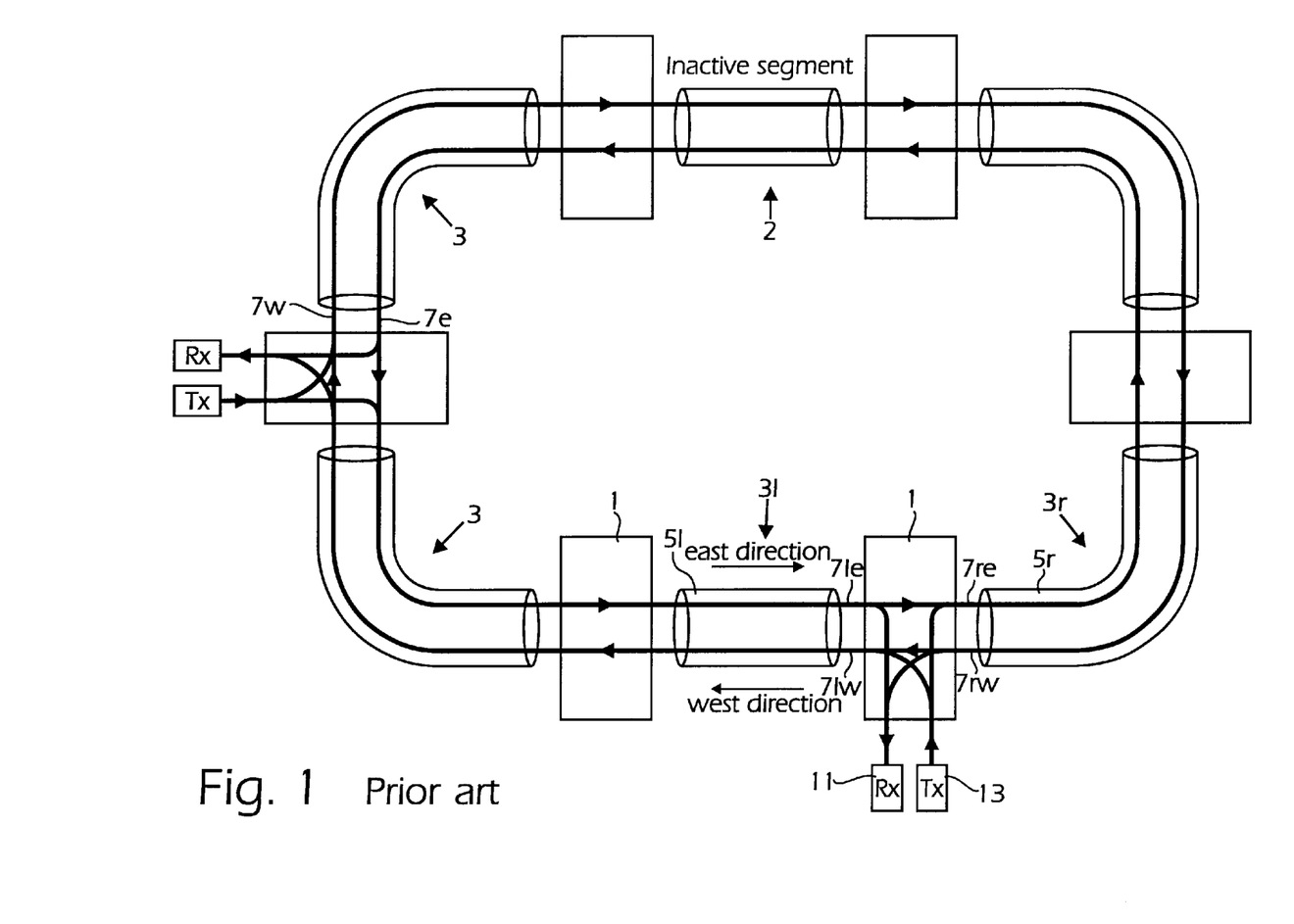
FIG. 1 is a general schematic view of a prior art optical fiber network of WDM type using the flexible bus architecture.

A network using the basic flexible bus structure for WDM communication on optical fibers is illustrated in FIG. 1. A plurality of optical, add and drop nodes 1 are connected to each other by links 3 to form a network or bus comprising a physical ring structure having as basic elements a pair of optical fibers 7e, 7w connected to form two parallel fiber rings. Each fiber ring carries light propagating in a definite direction, the propagation directions of the two rings being opposite to each other. Thus, in one of the fiber rings light always propagates in the counter-clockwise direction, in the embodiment of FIG. 1 the inner ring 7e, this direction being called the east direction hereinafter. In the other one 7w of the rings of the pair of fiber rings light always propagates in the opposite direction, i.e. in the clockwise direction, as seen in FIG. 1, this direction being called the west direction. A node 1 in the bus structure is thus physically connected only to two neighbouring nodes, a left node and a right node. The connections of a considered node 1 thus include a left physical link 3l comprising a west line cable 5l and a right physical link 3r comprising an east line cable 5r, the other end of each link 3l, 3r being connected to the neighbouring left and right node respectively. Each piece 5l, 5r of line cables comprises a pair of optical fibers 7le, 7lw and 7re, 7rw respectively, where in one 7le, 7re of the fibers of a fiber pair in a link 3l, 3r light always propagates in one direction, as in the east direction as seen in FIG. 1, and in the other one 7lw, 7rw of the fibers of the fiber pair in a link light always propagates in the opposite direction, in the clockwise or west direction, as seen in FIG. 1. Furthermore, a node 1 is connected to or contains receivers 11 and transmitters 13 for converting optical signals to electrical signals and vice versa, the electrical signals being transferred or received respectively from other devices, links or networks, not shown.

One of the links 3 of the ring structure is always deactivated, see the link 2 in FIG. 1, so that at least no light carrying the useful information to be transferred in the network can pass therethrough, in neither direction. This prevents that such light signals and ASE noise can circulate along the ring structure in several turns, ASE noise being amplified spontaneous emission produced in in-line optical amplifiers which are usually included in the nodes 1. When there is a failure in a link between neighbouring nodes, the network can be reconfigured so that this link will then be the deactivated one whereas the previously deactivated link (2) is now activated and operates like the other active links (3) in the ring structure passing signals in the two opposite directions.

Figure 2:
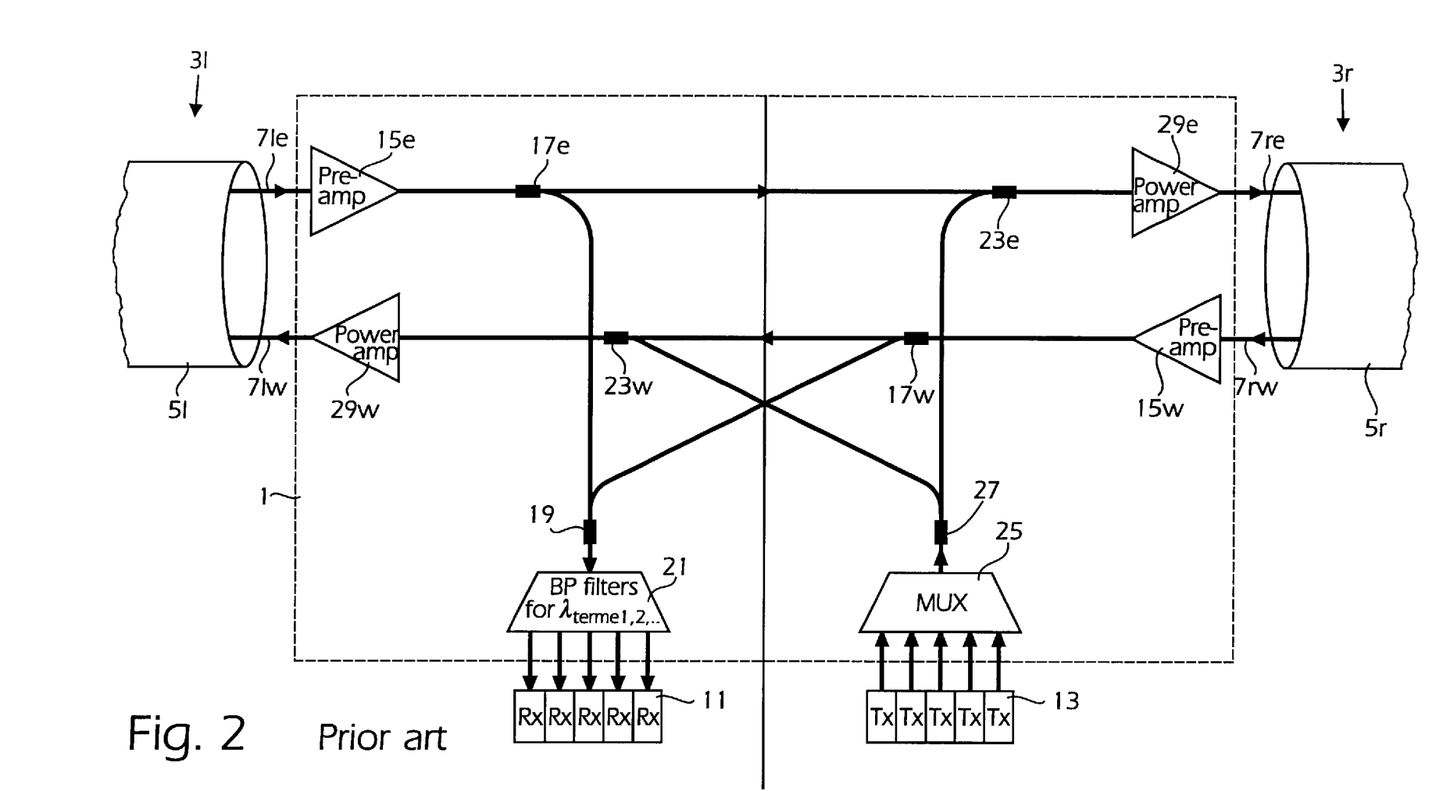
FIG. 2 is a block diagram of a prior art add and drop node of a simple configuration intended to be used in the network of FIG. 1.

A basic structure of a node 1 in the basic flexible bus structure of FIG. 1 is shown in the block diagram of FIG. 2. The optical WDM traffic comprising a plurality of WDM channels having definite, separate wavelengths, each channel occupying a wavelength band around the wavelength of the channel, enters the node from the left or in the east direction and from the right or in the west direction on the fibers 7*le* and 7*rw* respectively. The incoming signals can be amplified in optional optical preamplifiers 15*e*, 15*w* respectively in which the light signals are amplified. The incoming light is then split in drop couplers 17*e*, 17*w*. These couplers arc optical power splitters that feed a portion of the total power of the light propagating in on direction in the bus, through an optical combining coupler 19, adding the deflected power portions from each direction to each other, to a bank 21 of filters, which can also be called an optical demultiplexer, having one or more bandpass filters for wavelengths used in the transmission in the network. Thus the filter bank 21 filters out channels, each channel carrying information in a definite wavelength band. The filtered out light signals are then forwarded to opto-electrical receivers 11, one optical receiver being arranged for each received channel.

The remaining part of the light power split in the drop couplers 17*e*, 17*w* is forwarded through the node 1 and is in add couplers 23*e*, 23*w* mixed with new traffic to be added in the node. This new traffic is obtained from electro-optical transmitters 13, which each one transmits optical signals of a wavelength band or of a channel different from that of the other transmitters. The output signals of the transmitters 13 are added to each other in an optical combining coupler or optical multiplexer 25, the resulting combined signal then being split in a splitting coupler 27 in two portions having equal power, one of the two portions being transmitted to one of the add couplers 23*e*, 23*w* and the other portion being transmitted the other one of the add couplers. The light signals obtained from the add couplers 23*c*, 23*w* for each direction are fed to the fibers 7*re*, 7*lw*, which are contained in the links 3*r*, 3*l* connected to the node and carrying light going out from the node, through optional optical power amplifiers 29*e*, 29*w*.

In the node design as illustrated in FIG. 2 the lack of in-line blocking filters and into line switches should be observed and in particular that light propagates through or passes the node in a substantially unaffected or uninterrupted way. Furthermore, the transmitters 13 are sending in and the receivers 11 are listening to both traffic directions simultaneously. The left side or the right side amplifiers 15*e*, 29*w* or 15*w*, 29*e* respectively can be used to deactivate the respective links or segments 3*l*, 3*r* connecting the node to the two neighbouring nodes. This is made in the case where this link is to be the deactivated one, such as in the case of a failure of this link. Such a failure can be caused e.g. by one of the fibers of the pair of the link being broken or by one of the optical amplifiers connected to this link being defective.

The bus structure and node design according to FIGS. 1 and 2 are described in the above cited article by B. S. Johansson et al. and in the cited U.S. patent application Ser. No. 08/421,734. However, this structure only allows that a considered wavelength or channel is used once in the network in each direction, such as for communicating between two nodes. A node architecture allowing a reuse of wavelengths, i.e that a channel or wavelength is used more than once for transferring information in one direction, is disclosed in the cited International patent application WO 96/31025 resulting in a more efficient use of available wavelengths. However, this prior node design has a multitude of demultiplexers and switches connected in-line, in the direct path of a fiber of the network or bus through the node. Still, this prior node allows a very efficient use of the wavelength range or equivalently a very efficient use of available channels.

Figure 3:
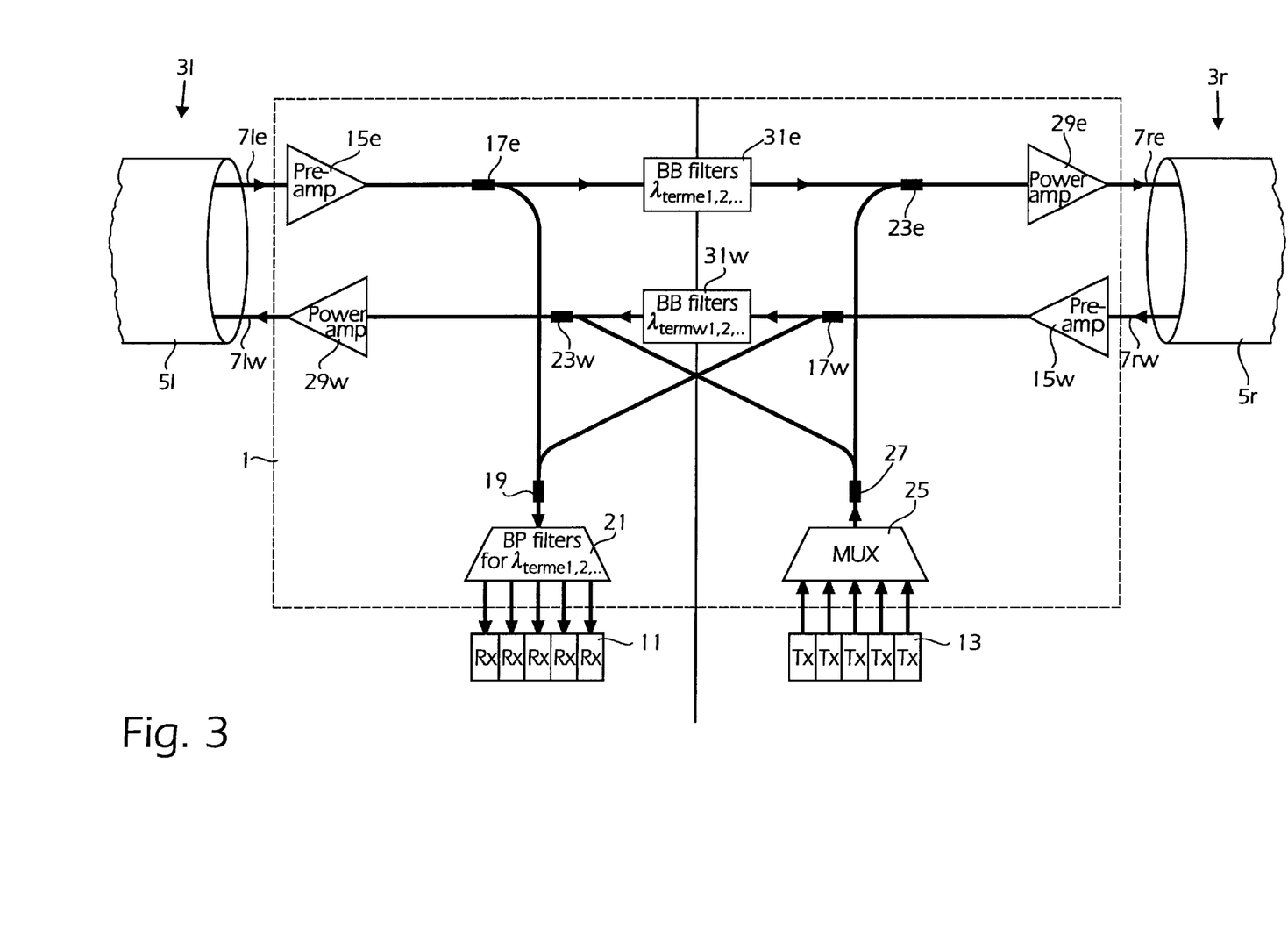
FIG. 3 is a block diagram of an add and drop node similar to that of FIG. 2 allowing a limited reuse of wavelengths in the network of FIG. 1.

A design of an add and drop node based on the design according to FIG. 2 that can allow some rouse of wavelengths is illustrated in FIG. 3. There, the node structure differs from that of FIG. 2 only in that for each propagation direction in the bus a wavelength blocking or band blocking filter 31*e*, 31*w* is connected between the drop coupler 17*e*, 17*w* and the add coupler 23*e*, 23*w* connected to the fiber for the respective direction. The band blocking filters 31*e*, 31*w* block that or those wavelength bands which are terminated in the node for the traffic direction of the fiber, in which the respective blocking filter is connected. The node according to FIG. 3 has only band blocking filters connected in-line and no switches, what makes the node more reliable than the above-mentioned prior node allowing a reuse of wavelengths. In this node, like the node of FIG. 2, the same information signals are simultaneously transmitted in the opposite directions, on both links connected to the node, what limits the possible reuse of wavelengths and does not allow moving the inactive segment needed for the flexbus network according to FIG. 1. Thus, some switching of channel directions must be provided if a node of the kind illustrated in FIG. 3 is to be used in such a network.

Figure 4:
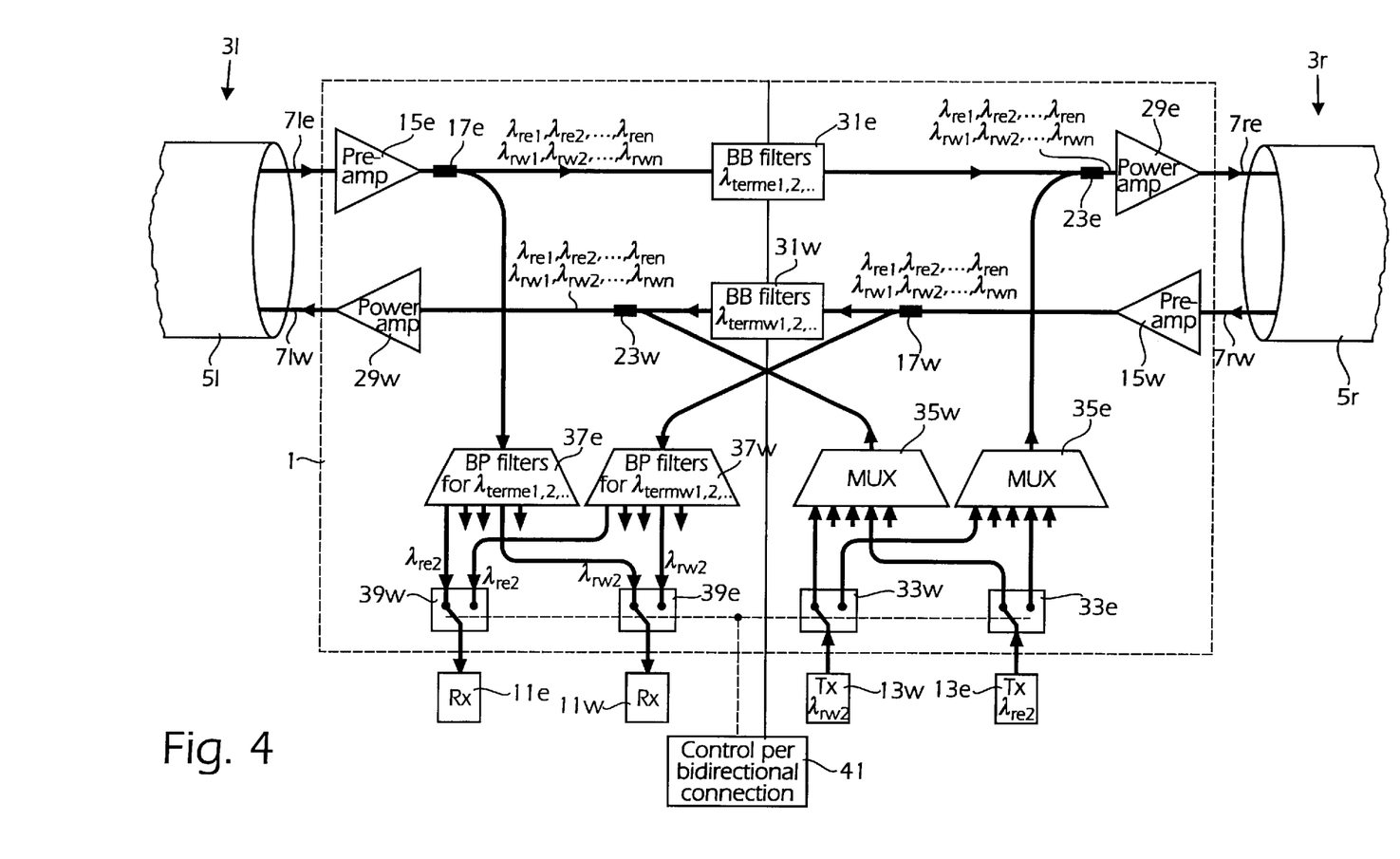
FIG. 4 is a block diagram of an add and drop node allowing an efficient reuse of wavelengths and intended to be used in the network of FIG. 1.

Hence, in FIG. 4 a block diagram of the general architecture of a node for a network of the kind illustrated in FIG. 1 is shown, this node being obtained from the node of FIG. 3 by adding switches and by providing filter blocks and multiplexers for each direction. It can be observed that the switches are not connected in-line. The only attenuating in-line elements are the blocking filters 31*e*, 31*w* in addition to the always necessary couplers. The node architecture of FIG. 4 allows a reuse of wavelengths for networks of the flexbus type as illustrated in FIG. 1 resulting in an enhanced capability of the network system, i.e. that more nodes can be used in a network for the same number of multiplexed wavelengths. The reuse of wavelengths in the node is as efficient as in the prior art node according to the cited International patent application WO 96/31025. However, the node as depicted in FIG. 4 has no in-line switches and a minimum of in-line blocking filters causing a minimum of concatenated filtering effects what totally makes it more efficient than the prior art node.

For the node illustrated in FIG. 4 the light signals propagating in the east direction and incoming to a considered node include at least all the wavelengths $\lambda_{re1}, \lambda_{re2}, \ldots, \lambda_{ren}$, which correspond to all those channels, which arrive in this direction and are both terminated and reused in a node in this direction. In the corresponding way the light signals propagating in the west direction and incoming to the considered node include at least all the wavelengths $\lambda_{rw1}, \lambda_{rw2}, \ldots \lambda_{rwn}$, which correspond to all those channels for west travelling signals, which are both terminated in a node and reused in a node in the west direction. The two sets $[\lambda_{re1}, \lambda_{re2}, \ldots, \lambda_{ren}]$ and and $[\lambda_{rw1}, \lambda_{rw2}, \ldots \lambda_{rwn}]$ of wavelengths terminated and reused in any node of the network can for example contain different wavelengths. Other wavelength channel& not included in these sets may also exist, which can e.g. be used for carrying information bi-directionally between two nodes. In the normal case, as appears from FIGS. 6*a* and 6*b*, the light signals incoming to an inner node in one direction will at least include the union of the wavelength sets mentioned, i.e. all the wavelengths $[\lambda_{re1}, \lambda_{re2}, \ldots, \lambda_{ren}, \lambda_{rw1}, \lambda_{rw2}, \ldots, \lambda_{rwn}]$.

Each of the blocking filters 31*e*, 31*w* in a node according to FIG. 4 blocks only the wavelengths $\lambda_{terme1}, \lambda_{terme2}, \ldots$ and $\lambda_{termw1}, \lambda_{termw2}, \ldots$ respectively of those channels which are terminated in the node for the respective direction, the blocked wavelengths being determined by assuming that the node is connected as an inner node at a standard position in the network. An end node is herein defined to be a node connected directly to the inactive link of the bus network and an inner node is defined as a node which is not an end node. When the inactive link 2 is relocated, i.e. when "the bus flexes", a former end node can become an inner node and vice versa, but of course the same wavelengths are blocked in the node. All wavelengths which are not included in the set of wavelengths [$\lambda_{terme1}$, $\lambda_{terme2}$, . . . ] of channels terminated in the east direction, are just passed through the node in the east going direction in a basically unaffected way. In the same way all wavelengths which are not included in the set of wavelengths [$\lambda_{termw1}$, $\lambda_{termw2}$, . . . ] of channels not terminated in the node in the west direction, are just passed through the node in the west going direction in a basically uninterrupted way.

Figure 6:
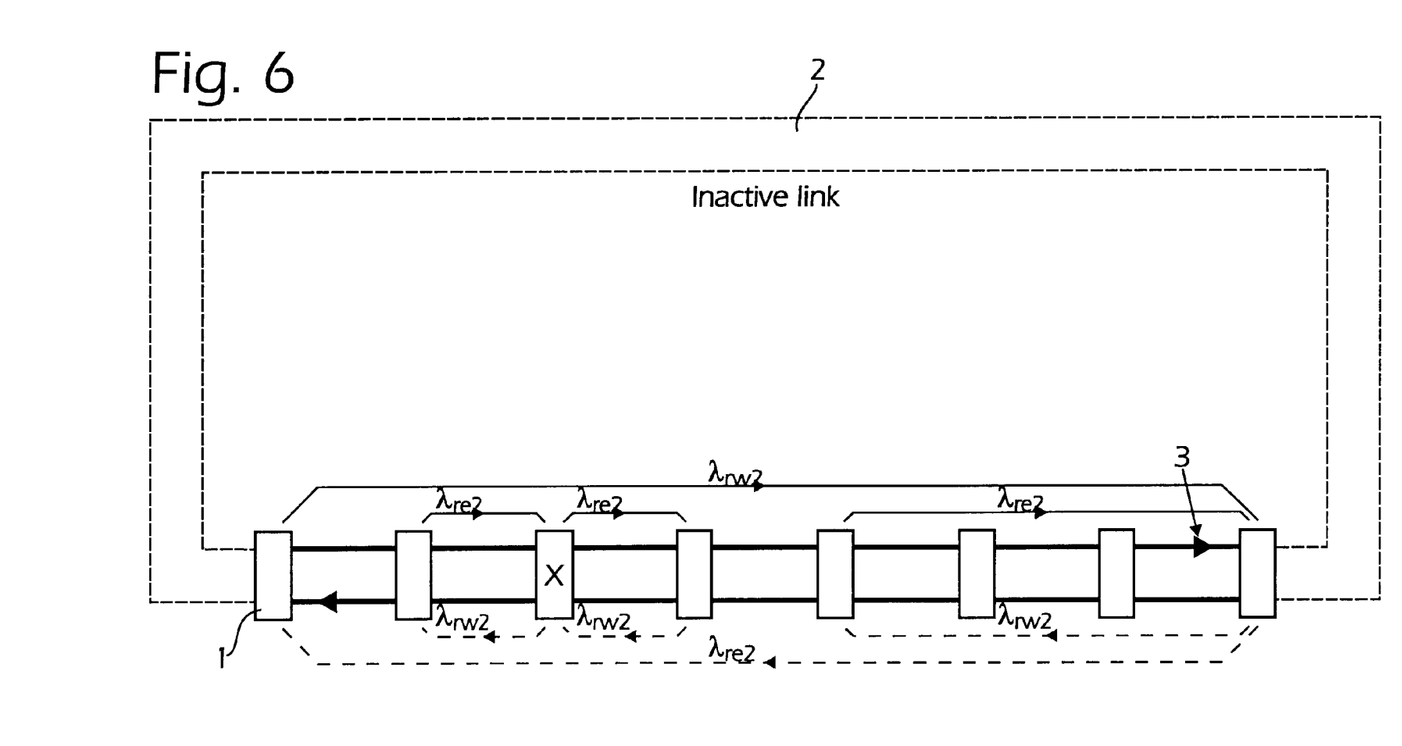
FIG. 6 is a graph illustrating the assignment of wavelengths in a network of the kind illustrated in FIG. 1 having nodes according to FIGS. 3, 4 or 5.

The principle of allocating and reusing a wavelength in a self-healing annular network of the flexbus type as shown in FIG. 1 is illustrated by the diagram of FIG. 6 showing a flexible bus having eight nodes 1 joined in a line configuration by a bus consisting of links 3 between neighbouring nodes and each comprising two optical fibers, the outer-most nodes being joined by an inactive link 2 also comprising two optical fibers. Above the line of nodes communication in the east direction is shown wherein a wavelength $\lambda_{re2}$ is reused and a different wavelength $\lambda_{rw2}$ is not reused but used for transmitting information between the two end nodes and beneath the line of nodes is shown a symmetric use of the same wavelengths where for all communication in the west direction the wavelength $\lambda_{rw2}$ is reused and the wavelength $\lambda_{re2}$ is used for transmitting information between the two end nodes.

In FIG. 6 it is seen, that a wavelength may only be reused in one of the directions on the bus, but can be reused in any convenient connection in that direction, as long as none of the connections, for which the wavelength is used, overlap each other. In the reverse direction, i.e. on the other fiber of network fiber bus, the same wavelength is only allowed to be used once, and has to have a span that at least overlaps all of the spans for which the wavelength is used in the first direction. This implies that if a wavelength is reused in any one of the directions, the receiver-transmitter pair on that connection have to use different wavelengths. A wavelength that is terminated in a node does not have to be reused in that node, but can be used for transmission in the same direction by a node located in the same direction from the considered node. The use of a wavelength for a bi-directional connection is only allowed if that wavelength is not used for any other connection in the network, this case not being illustrated in the figure.

In FIG. 4 the same reference numerals as in FIGS. 2 and 3 are used for identical or corresponding elements. In both directions in the middle of the node, thus the blocking filters 31e, 31w are connected between that output of the drop coupler 17e, 17w which carries the signal to be forwarded through the node and an input of the respective add coupler 23e, 23w. The light signal incoming in each direction includes at least all the wavelengths, which for signals propagating in a considered direction correspond to all those channels, which are both terminated in a node and reused in a node of the system in this direction, these nodes being the same one or different nodes. A wavelength channel is said to be terminated in a node if it is received in the node, i.e. if there is a receiver 11e or 11w for this channel in the node, and it is said to be reused in a considered node if two conditions are fulfilled, namely if it is used for transmission from the node, i.e. if there is a transmitter 13w, 13e for this channel in the considered node, and at the same time the same channel is used for transmitting information in the same direction by another node.

In the diagram of a node according to FIG. 4, which can e.g. be the node X in FIG. 6, those components are illustrated which are required for receiving from a node on the left or west side on only one wavelength $\lambda_{re2}$. This wavelength signal is thus included in the total light signal travelling in the eastern direction and this wavelength is reused in the east going direction from the node in order to carry information from the node in this direction. The directions are indicated for the case that the node depicted in FIG. 4 is connected as an inner node like the node X in FIG. 6. In the similar way those components are shown in FIG. 4, which are required for receiving information on a single wavelength $\lambda_{rw2}$ in the reverse direction, the western direction. The channel of this wavelength is thus terminated in the node and the wavelength is reused in the western direction for carrying information from the node. In this case we can then see, that the same wavelength is used for receiving signals from another node at one side of the considered node and for transmitting signals to another node at the opposite side of the considered node. Only the channels reused in a node have to be blocked by the in-line band blocking filters 31e, 31w in the node, but it may be advantageous to block also all wavelengths, which are terminated in the node but not reused in the node, if such wavelengths exist, see the discussion of the dynamical range of the light signal in conjunction with FIG. 5.

In order to allow an efficient use of wavelengths and thus of the dynamical range a signal must only be transmitted from the considered node in that direction in which it can reach the node to which it is to be communicated, considering the position of the inactive link 2. The standard connection of a node is when it is connected as an inner node and not as an end node, the term end node hero being taken to mean a node connected directly to the inactive link, as indicated above. For the standard connection the transmitters of a node are in a natural way divided in transmitters 13e for sending in the east going direction and transmitters 13w for sending in the west going direction. Each transmitter 13e, 13w has its output terminal connected to a simple 1:2 switch 33e, 33w. The outputs of these transmitter switches 33e, 33w are connected to two multiplexer blocks 35e, 35w corresponding to the multiplexer 35 of FIGS. 2 and 3, one multiplexer block 35e for traffic in the east direction and one multiplexer block 35w for traffic in the west direction. The output of the multiplexer 35w for the west direction is connected to an input of the add coupler 23w for the fiber carrying traffic in the west direction and the output of the multiplexer 35e for the east direction is connected to an input of the add coupler 23e for the east going direction.

Like the embodiments according to FIGS. 2 and 3, the optional preamplifiers 15e, 15w are each followed by a drop coupler 17e, 17w. The drop couplers couple a suitable share of the power of the received light to separate blocks or banks 37e, 37w of bandpass filters, one block 37e containing bandpass filters for each of the wavelengths $\lambda_{teme1}$, $\lambda_{teme2}$, . . . , which correspond to channels in the east going direction which are terminated in the node, and another block 37w containing bandpass filters for each of the wavelengths $\lambda_{termw1}$, $\lambda_{termw2}$, . . . , which correspond to channels carrying traffic in the west going direction and terminated in the node. The output of each of the filters in such a filter block 37e, 37w, which thus carries a light signal of a specific wavelength or of a specific narrow wavelength interval, is connected to a 2:1 switch 39e, 39w, one such switch 39e, 39w thus being arranged per wavelength or channel terminated in the node. By means of each such switch 39e, 39w the direction is chosen, from which the respective wavelength is to be received, i.e. whether it is to be received from the east side or from the west side in relation to the considered node. The output terminals of the two bandpass filters which filter out the same wavelength and are included in the two filter is banks 37e, 37w are thus connected to the same 2:1 switch 39e, 39w. The receiver 11e, 11w for a specific wavelength $\lambda_{re2}$ or $\lambda_{rw2}$ is connected to the output terminal of such a 2:1 switch 39e, 39w, the switch being set in the appropriate position depending on the location of the source of information, i.e. to the east or to the west of the considered node, and generally also depending on the location of the deactivated link segment 2. All the switches 33e, 33w, 39e, 39w can be controlled by a control unit 41, programmed to set the switches in correct positions depending on the network status, i.e. the location of the node in relation to the presently inactive link 2.

The filters in the filter blocks 37e, 37w could also be arranged directly in or at the respective receiver 11e, 11w, the filter blocks then being replaced with power splitters, not shown, splitting the light power in equal parts, one part for each receiver 11e, 11w in the considered direction.

If in the node of FIG. 3 a certain wavelength $\lambda_{termek}$ or $\lambda_{termwk}$ is to be received from one direction and reused in the same direction, then the same wavelength must be able to propagate through the node on the other fiber in the opposite direction, if a maximum reuse of the available wavelengths is to be achieved, see FIG. 6 and the International patent application WO 96/24998 cited above describing efficient wavelength allocation. In FIG. 4 the positions of the switches 33e, 33w and 39e, 39w are illustrated for a node not being an end node, i.e. in the case in which it is not connected at one of its sides to the inactive link 2. If the "bus has to flex", i.e. if the inactive link has to become active and another link has to become inactive, owing to some failure in this another link and the considered node then becomes connected directly to the inactive link, one of the receiver switches 39e, 39w then has to change its position and that one of the switches 33e, 33w connected to a transmitter 13e, 13w which sends to the same node also has to change its position. The receiver and transmitter switches 39e, 39w and 33e, 33w for changing the paths for a correct connection with another node, i.e. for receiving from and transmitting correctly to the other node, can thus be linked to the same triggering point, simplifying the procedure which must be executed by the control unit 41. It can be observed that the wavelengths blocked by the blocking filters 31e, 31w in each direction do not have to be changed for a flexing situation owing to the specific allocation of wavelengths.

Some channels may not be reused in any of the directions, such node-to-node-connections using two own wavelengths, which can suitably be the same wavelength. For these channels it is not necessary to have duplicated demultiplexing bandpass filters included in the filter blocks 37e, 37w and hence the corresponding 2:1 switches 39e, 39w are not needed for these wavelengths. The 1:2 switches 33e, 33w for the transmitters 13e, 13w are not needed either for these wavelengths. This reduction in components may improve reliability and cost.

The node design according to FIG. 4 makes it possible to achieve a maximum reuse of wavelengths and thus a maximum wavelength efficiency, while using a minimum amount of in-line filtering and no in-line switches. A certain wavelength is, however, not blocked in the reverse direction in the receiving node. This implies that that wavelength channel will continue to propagate all the way to the end node and will consequently unnecessarily take up part of the available dynamic range on that part of the bus, which implies a potential degradation of the transmission potential on that part. The alternative node architecture illustrated by the block diagram of FIG. 5 can be used in order to mitigate this problem. The same reference numerals as in FIG. 4 are used in FIG. 5 for identical or corresponding elements. In this node design the blocking filters 31e, 31w for the east going and west going traffic respectively are connected like the blocking filters 31e, 31w of FIG. 3 and are each arranged to block all channels that are terminated in the node, both in the east and west going directions, so that the set [$\lambda_{termw1}$, $\lambda_{termw2}$, ... ] of wavelength s blocked by the bandblocking filters 31e in the node in the east going direction contains the same wavelengths as to set [$\lambda_{termw1}$, $\lambda_{termw2}$, ... ] of wavelengths blocked in the node by the bandblocking filters 31w in the west going direction.

Figure 5:
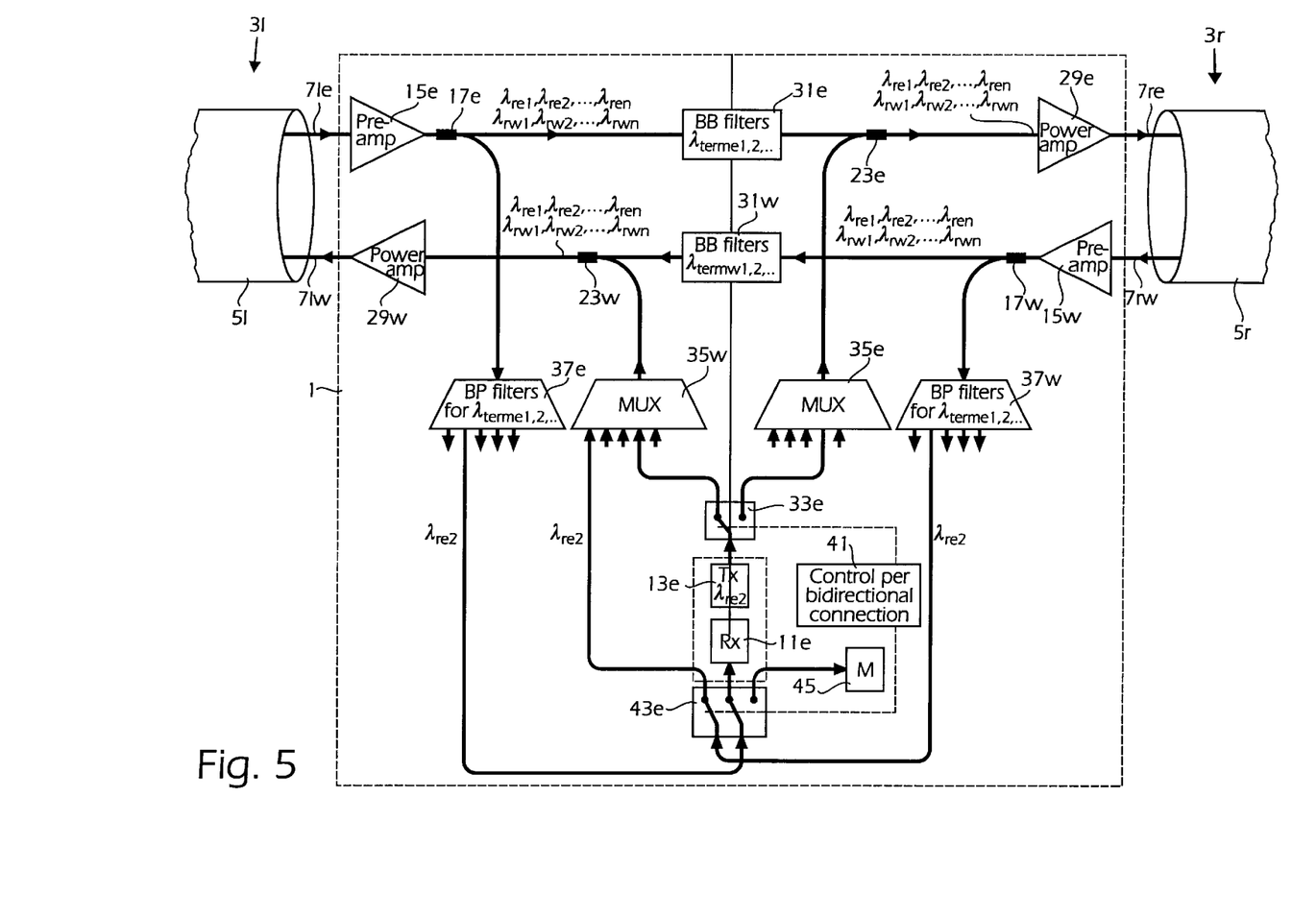
FIG. 5 is a block diagram of an add and drop node similar to that of FIG. 4 but having slightly improved transmission performance.

In FIG. 5 the node is illustrated to only receive information on a wavelength $\lambda_{re2}$ which for the case that the node is connected in the standard way as an inner node is included in the light travelling in the eastern going direction and to reuse this wavelength. The transmitter 13e and the receiver 11w are adapted to transmit and receive on this wavelength. Since a wavelength which is received from and is reused in one direction has to be capable of passing through the node on the other fiber in the reverse direction, it is necessary to bypass the blocking filter 31e in the node for this direction. This is allowed by the introduction of 2:3 switch 43e instead of the simpler 2:1 receiver switch 39e according to FIG. 4, this 2:3 switch 43e being arranged to connect the pass-through channel to the multiplexer 35w. The two inputs of the 2:3 switch 43e are connected to bandpass filters for this wavelength $\lambda_{re2}$ included in each of the filter blocks 37e, 37w. The middle output terminal of the 2:3 switch 43e is connected to the receiver 11e and one of the two outer output terminals of the switch is connected to an input of that one 35w of the multiplexers 35e, 35w which has its output terminal coupled to the add coupler 23w for traffic in the opposite direction compared to that of the reused wavelength. The other outer output terminal of the 2:3 switch 43e can be connected to a monitoring device 45. In the case, where the considered node receives information on the wavelength $\lambda_{re2}$ in light propagating in the east direction, as is the standard case for the considered node, the switch 43e is set to connect the output signal of the filter for $\lambda_{re2}$ in the block 37e of filters for east going traffic to the receiver 11e and to connect the output signal of the filter for $\lambda_{re2}$ in the block 37w of filters for west going traffic to the input of the multiplexer 35w for west going traffic. In the case where the inactive link 2 has to be changed so that the same wavelength $\lambda_{re2}$ has to instead be received from the opposite direction, i.e. is contained in the west going traffic, the switch 43e has to change its position. Then the output signal of the filter for $\lambda_{re2}$ in the block 37w of filters for west going traffic is connected to the receiver 11e, whereas the output signal of the filter for $\lambda_{re2}$ in the block 37e of filters for east going traffic is connected to the monitoring device 45.

The transmitter 13e is connected through a 1:2 switch 33e to either one of the multiplexers 35e, 35w as in FIG. 4, the switch being in its standard state, where it receives information on the wavelength band around $\lambda_{re2}$ in the east-going traffic, connected to the multiplexer 35e for the traffic going in the same, eastern direction. The switches 33e, 43e are controlled by a common control unit 41.

For each wavelength received and reused in the node there will be arranged components corresponding to those illustrated in the lower portion of FIG. 5. In a node being in its standard state, for traffic normally going in the west direction some of the components will have a mirrored construction and mirrored connection compared to what is shown and the switches will be set in opposite positions compared to those illustrated in FIG. 5.

The efficient allocation of wavelengths for a self-healing network has been discussed above in Conjunction with FIG. 6. Generally, for a certain traffic demand, a number of different solutions to the allocation of wavelengths requiring a minimum total number of wavelengths may often be found. In searching for a good solution it may often be helpful to utilize the basic symmetry of the two directions resulting from the bi-directionality of the connections.

Achievable network capacities and wavelength efficiency are as follows. Consider a situation when there are N nodes and the available number of wavelengths in the network are $N_{80}$. For the flexible ring structure having simple nodes as illustrated in FIG. 2, the maximum number of connections are then equal to $N_\lambda$, independently of the type of traffic, that is whether it is a hubbed, meshed or adjacent traffic demand. The required number of wavelengths allowing communication between all N nodes (the "full mesh" traffic situation) is given by $N(N-1)/2$.

For nodes having the complex architecture as indicated in FIGS. 4 or 5, the possible number of connections, $N_c$ will depend on the traffic demands as follows:

$N_c = N_\lambda$ for hubbed traffic (where e.g. one node is die "hub")

$N_c \neq 2 N_\lambda$ for fully meshed traffic (traffic between all nodes)

$N_c = N \cdot N_\lambda/2$ for purely adjacent traffic demands (traffic only between neighbouring nodes)

The necessary number of wavelengths for a full mesh of N nodes is given by:

$N_\lambda = N^2/4$ for N even $N_\lambda = (N^2-1)/4$ for N odd

An add/drop node has thus been described, which when used in a self-healing annular network allows an efficient wavelength allocation and an efficient use of the dynamic range. It has a minimum of in-line components which otherwise could degrade signals is passing through the node in an uninterrupted way.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A node arranged to be connected in a network having a ring configuration including two optical fibers carrying light signals in opposite directions, the network comprising links connecting neighboring nodes with one inactive link carrying no light signals, the network being arranged to allow that the inactive link is made active and another one of the links is made inactive and to carry light signals in a plurality of wavelength bands separate from each other, the node comprising:

a drop coupler and an add coupler for each of the opposite directions for taking out a share of the light signals at the node and for adding light signals in the node to the light signals carried in the network, respectively, receivers for receiving light signals in wavelength bands in the node;

transmitters for transmitting light signals in wavelength bands from the node into the network, a band blocking filter arranged between the drop coupler and the add coupler for blocking in a first one of the opposite directions light of all wavelengths included in the wavelength bands of the light signals which are received and/or terminated in the node from the first direction; and at least one switch connected according to one of the following cases:

to one of the receivers and to the drop couplers for allowing the receiver to receive light signals from either one of the opposite directions, and to one of the transmitters and to the add couplers for allowing the transmitter to transmit light signals in either one of the opposite directions.

2. The node of claim 1, wherein the band blocking filter is arranged to block light of all wavelengths included in the wavelength bands of the light signals which are received in the node from either one of the opposite directions and which are reused in the node.

3. The node of claim 2, further comprising a switch in a first position for letting light signals of a wavelength band pass through the node, substantially unaffected, in the first one of the opposite directions, and the switch in a second position different from the first position blocking light of the wavelengths included in the wavelength band received from the second one of the opposite directions.

4. The node of claim 3, wherein the switch comprises a 2:3 switch having two inputs, the two inputs being connected to bandpass filters blocking light of the wavelengths included in the wavelength band, each bandpass filter being connected to an individual one of the drop couplers, so that the bandpass filters receive light from opposite ones of the opposite directions.

5. The node of claim 3, wherein the switch comprises a 2:3 switch having three outputs, one of the outputs being connected to a receiver for light signals of the wavelength band and another one of the outputs being connected to the add coupler for adding light signals in the second one of the two directions.

* * * * *